United States Patent [19]

Russell et al.

[11] 3,816,665

[45] June 11, 1974

[54] OPERATOR LOOP COMPLEX

[75] Inventors: Stanley L. Russell, West Webster; Klaus Gueldenpfenning, Penfield; Uwe A. Pommerening, Webster, all of N.Y.

[73] Assignee: Stromberg - Carlson Corporation, Rochester, N.Y.

[22] Filed: Sept. 29, 1972

[21] Appl. No.: 293,752

[52] U.S. Cl. .......... 179/18 AD
[51] Int. Cl. .......... H04m 3/00
[58] Field of Search ..... 179/18 AD, 18 AH, 18 HA, 179/27 CA, 37 CB, 27 FF, 42, 175.2 C

[56] References Cited

UNITED STATES PATENTS

| | | | |
|---|---|---|---|
| 3,697,700 | 10/1972 | Greason | 179/18 AD |
| 3,719,784 | 3/1973 | Adams | 179/27 CA |

*Primary Examiner*—Ralph D. Blakeslee
*Attorney, Agent, or Firm*—Charles C. Krawczyk; William F. Porter, Jr.

[57] ABSTRACT

An operator loop complex for use in a private automatic branch exchange for connecting any one of a plurality of trunks to any one of a plurality of operator consoles via a switching network comprises a position circuit for each console and a plurality of loop circuits associated with each position circuit whereby each connection to a console is made through a position circuit and one of the loop circuits associated therewith under a common control arrangement which enables only one loop circuit to be connected to a trunk at any one time in response to an operator service request from the trunk and whereafter the loop circuit may remain connected to the trunk while being disconnected from the position circuit.

7 Claims, 6 Drawing Figures

OPERATOR LOOP COMPLEX

BACKGROUND OF THE INVENTION

This invention relates to telephone private automatic branch exchanges and in particular to an operator loop complex for use in such an exchange for interconnecting trunks and operator consoles therein for permitting branch exchange operators to communicate with subscribers inside and outside of the exchange and to establish telephone connections therebetween.

In a copending application filed jointly herewith entitled, "Private Automatic Branch Exchange", Ser. No. 293,518, and assigned to the same assignee as the present application, a private automatic branch exchange having a capacity for automatically processing calls in connection with a large, substantially unlimited number of stations within the exchange is disclosed. To obtain such an exchange, the equipment for providing the usual features of a private automatic branch exchange was combined with the usual switching equipment of a central office. Another copending application filed jointly herewith entitled, "Private Automatic Branch Exchange Service Circuit Complex", now U.S. Pat. No. 3,769,462, and also assigned to the same assignee as the present application, described in detail the common control arrangement used in the "Private Automatic Branch Exchange" for connecting various type trunks to the various type service circuits used in providing the special features of the exchange.

In any private autoamtic branch exchange it is important that the exchange operator be capable of communicating with subscribers both inside and outside of the exchange, the telephone connection being initiated by either the subscriber or the operator. It is also important that once such a connection is established the operator be capable of extending the call to another subscriber with whom the first connected party wishes to speak. This capability is provided through the use of various type trunks there being one type of trunk for enabling a local subscriber to initiate a call to the operator, another type of trunk for enabling an operator to initiate a call to a subscriber and a third type of trunk for enabling a subscriber outside of the exchange to initiate a call to the operator. The initial call and extension of the call are routed through the trunk connected to the operator console trunk for that purpose.

In small private automatic branch exchanges there usually are a limited number of trunks since the telephone traffic through the exchange is expected not to be so great as to saturate the exchange. Consequently, one exchange operator may be adequate to handle the trunk traffic involving the services of an operator; however, such as taught in the aforementioned copending applications, a large number of trunks are normally required for servicing the telephone traffic therethrough. In this case, more than one exchange operator is normally required for handling operator calls. To expedite telephone calls and to provide flexibility for fairly distributing the calls among the exchange operators, it is desirable that any one of the trunks be capable of being connected to any one of the operator consoles. In most present systems this is normally done through direct appearance trunks, viz trunks that are connected to each and every operator console in the system. Since this requires separate connections from each trunk to each operator console, this arrangement results in a great number of control lamps and pushbuttons at each operator console. Although this may be managable for small exchanges, it becomes unwieldy and expensive in large exchanges. In some exchanges this problem is overcome by grouping the same type of trunk together so that the group can be more conveniently handled by one operator. This, however, sacrifices the flexibility of properly and fairly distributing the telephone traffic among the exchange operators, especially when telephone traffic patterns are variable.

In other exchanges, the problem is overcome through a switching arrangement wherein a trunk is connected in series through another trunk and then through switching equipment normally used for permitting local subscribers to call one another automatically without the help of an operator. Although this arrangement does overcome the need for direct appearance trunks at each and every console, it does create other undesirable results in that trunks and switching equipment not oridinarily used for operator calls are needlessly tied up, making them unavailable for this intended purpose. This produces an inefficient and expensive telephone system operation.

In many cases, once an operator has established a telephone connection between two subscribers and has released therefrom, it may be desirable that upon recall (a local subscriber hook flashes for the services of an operator) a telephone subscriber is connected to the same operator who initially set up the call. To accomplish this, the system normally requires that certain equipment used in establishing the initial connection between an operator and a subscriber be tied up during the course of the call. Since this makes the equipment unavailable for servicing other calls, it is a feature which is used only in special situations where it is deemed desirable or necessary. The design of the present systems is such, however, that this recall to the same operator feature is either always provided irrespective of the particular needs of each and every call, or is not provided at all. In the former case, the equipment is inefficient to the same operator and unnecessarily tied up since most calls do not require recall to the same operator. In the latter case, although the equipment is efficiently utilized, the recall to the same operator feature is not available to the operator even in those situations which might be deemed necessary or desirable.

With the foregoing in mind, it is a primary object of the present invention to provide a new and novel loop complex for use in a private automatic branch exchange for interconnecting trunks to operator consoles for permitting exchange operators to communicate with and to establish telephone connections between telephone subscribers both inside and outside of the exchange.

It is a further object of the present invention to provide such an exchange wherein any trunk is directly connectable to any operator console without the use of direct appearance trunks.

It is still a further object of the present invention to provide such an operator loop complex which permits an operator the option to release from a call after it has been set up with the capability of returning to the call if requested.

BRIEF DESCRIPTION OF THE INVENTION

The operator loop complex of the invention is used for interconnecting the operator consoles and trunks in a private automatic branch exchange through a switching network under the control of signals received from a common control means. The common control means receive operator service requests from the trunks and in response thereto applies signals to the trunks and the operator loop complex for enabling each trunk to be connected to an individual console through the complex and switching network at any one time.

The operator loop complex comprises a position circuit for each operator console and a plurality of loop circuits associated with each position circuit. In response to the signals from the common control means a particular position circuit enables an individual one of its associated loop circuits to be marked to the switching network for connection therethrough to a marked trunk. Once the connection is made, the operator and the subscriber may communicate with one another irrespective of which party initiated the call. Release means are provided so that after the call is extended to a second subscriber with whom the first connected party wishes to speak, the operator may release from the call completely in which case the position circuit and loop circuit are made available for servicing other calls. The release means is designed so that the operator may also partially release fom the call making the position circuit available for servicing other calls while maintaining the loop circuit connected to the trunk so that should a local subscriber in the call hook flash for the services of an operator, the operator who set up the call will be able to return to it.

The invention also provides for a rotary for preselecting an idle loop circuit for connection to a trunk prior to an operator service request by the trunk.

DETAILED DESCRIPTION OF THE INVENTION

Figure 1:
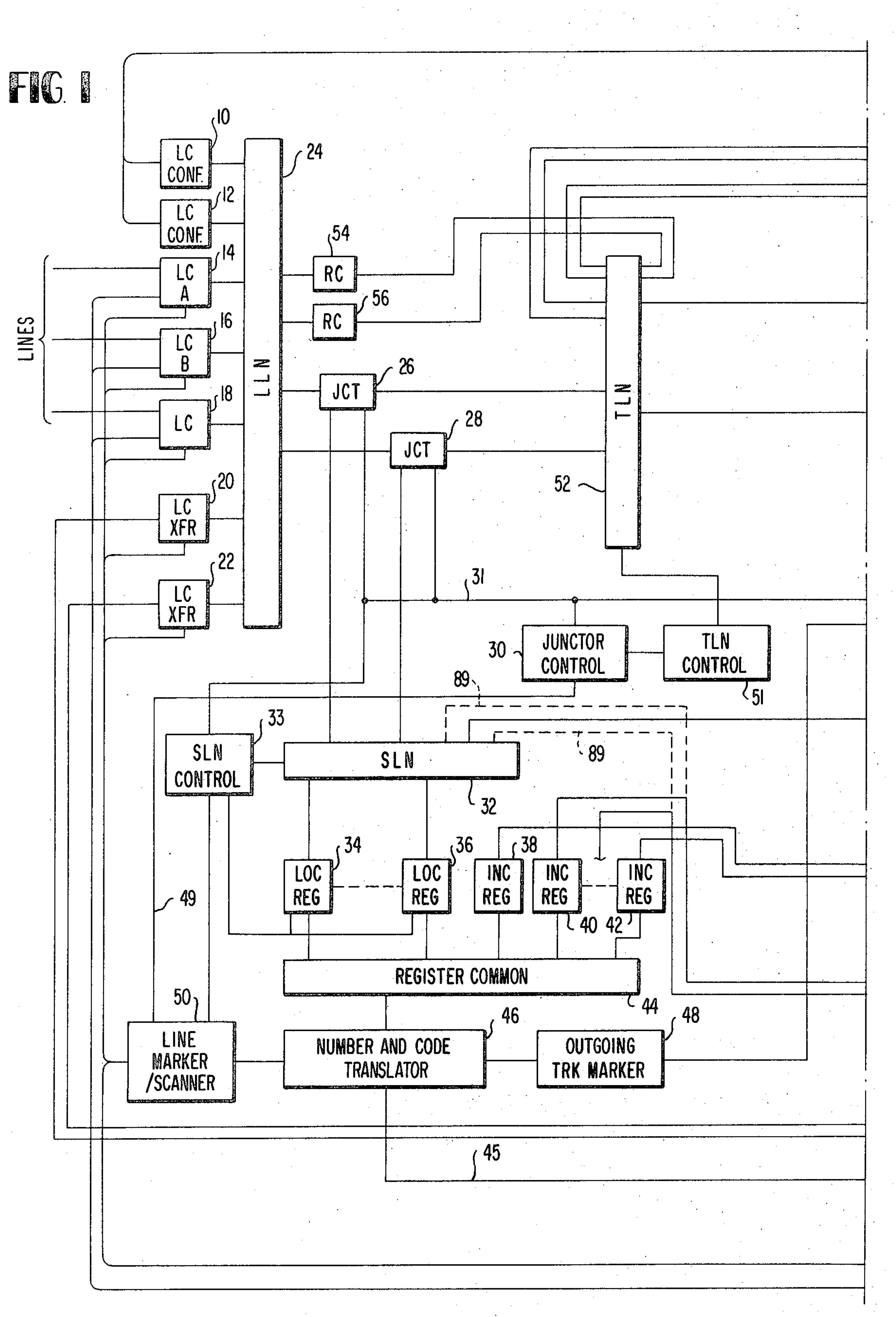
FIGS. 1–3 when combined in numerical order provide a schematic block diagram of the private automatic branch exchange in which the present invention may be utilized.
Figure 2:
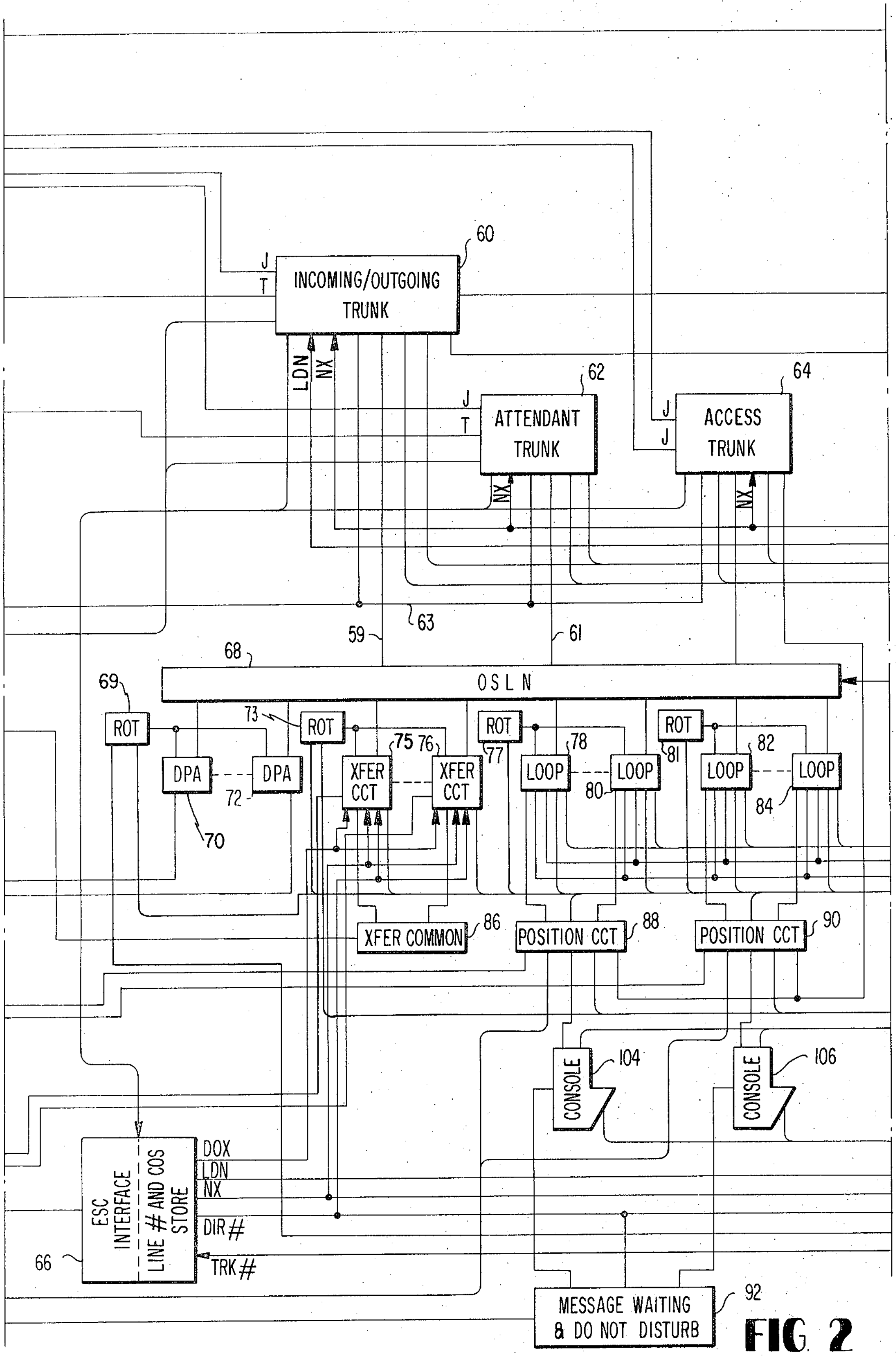
Figure 3:
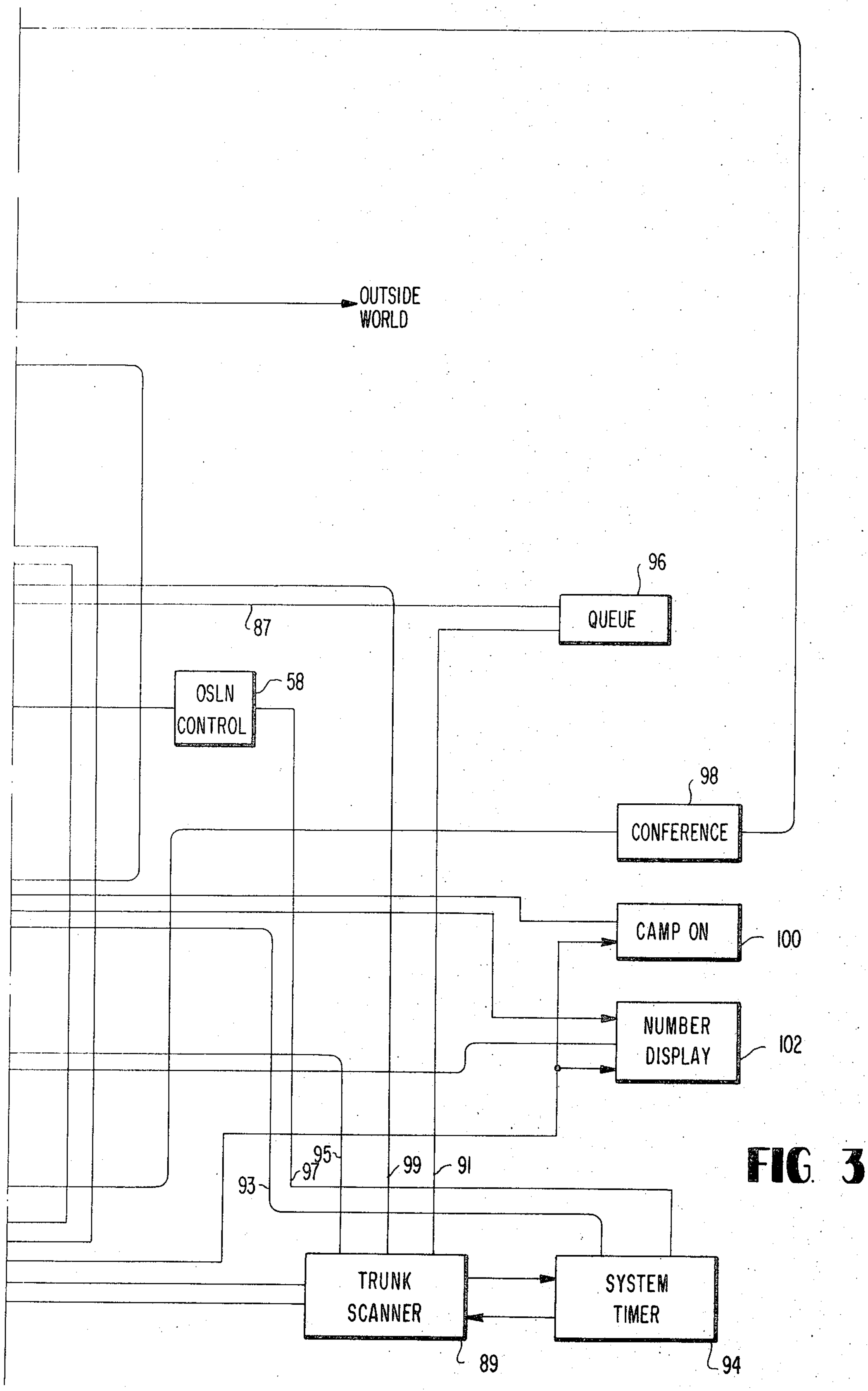

It will be seen from the drawings that FIG. 1 represents that portion of the system which relates to an electronic switching center; while, FIGS. 2 and 3 provide equipment which forms part of a private branch exchange. The invention may best be presented by first describing generally the overall operation of the exchange.

Looking first to the portion of the system illustrated in FIG. 1, which provides the electronic switching center (ESC) equipment, there is included a line link network (LLN) 24 which functions as a concentrator for originating line calls and a fan out for terminating calls. The LLN consists of two stages of matrices, for example, and is used for both originating and terminating types of traffic. One end of the LLN 24 is connected to a plurality of line circuits such as the conference line circuits 10 and 12, typical subscriber line circuits 14, 16, 18 and transfer line circuits 20 and 22. The number of subscriber line circuits provided vary in number in dependence upon the telephone service to be offered, but may typically exceed four thousand lines. The typical subscriber line circuits 14, 16 and 18 are more fully described in copending U.S. application Ser. No. 153,233, filed on June 15, 1971, for Otto Altenburger, which is assigned to the same assignee as the present invention.

The line link network 24 provides one unique path between circuits connected to opposite ends of the network. Each of the switching networks in FIG. 1 includes matrix switches comprised of relays including a mark or control winding for initially actuating the relay and a hold or sleeve coil connected in series with its own contacts for maintaining the relay in the actauted state after a path through the network has been establishd. The last stage of the line link network 24 provides a termination for both originating traffic from the line circuits and incoming tracfic to the line circuits. The terminating paths through the line link network to a line circuit are unique paths so that no path finding need be performed between the ringing controls 54 and 56 and a line circuit through the line link network.

The terminations for the originating paths through the line link network are connected to one of a plurality of junctors, such as junctors 26 and 28. The number of junctors and ringing controls provided depends upon the traffic requirements for the system. The ringing controls are more fully described in copending U.S. application Ser. No. 100,647, now U.S. Pat. No. 3,671,678 in the name of Otto Altenburger, which is assigned to the same assignee of the present invention. The junctor circuits 26 and 28 and the junctor control circuit 30 is more fully described in copending U.S. application Ser. No. 100,571, now U.S. Pat. No. 3,705,268, in the name of Otto Altenburger, which application is assigned to the same assignee as the present invention.

The junctors 26 and 28 serve as the focal points for all local originating type traffic. The junctors include provisions for connecting the line circuits to the local registers 34 and 36 via a service link network (SLN) 32, and for providing transmission battery for calling and called parties on intraoffice calls. The junctors are under the control of the calling party. When trunk or station busy conditions are encountered, the junctors provide the busy tone to the calling party.

The service link network 32 includes two stages of matrices (P and S) and is controlled by a SLN control circuit 33 for connecting the calling line circuit via one of the junctors to one of a plurality of local registers. The local registers, when connected to the junctors, provide dial tone and include apparatus for acting on the subscriber instructions. The junctors terminate on the P stage and the dial pulse acceptors (not shown) in the local registers terminate at the S stage of the service link network. The local registers include dial pulse acceptors which provide the dial tone to the calling subscriber, detect rotary dial pulses and extend the pulses to storage sections in the local registers.

The local registers also comprise a register storage and register output and a sender for providing outpulsing. The registers and senders are controlled by a register common 44 which contains the necessary control units. The local registers are connected to the register common 44 on a time division multiplex basis wherein information is passed from one equipment to another on a common bus basis. The register common 44 is also connected to communicate with a number and code translator 46 on a time division multiplex basis. The translation circuit provides information such as equipment number, ringing codes and class of service. The number and code translator 46 is connected to the line scanner-marker circuit 50 which has the means to detect service requests and means to access the individual line circuits.

The ringing controls 54 and 56 connect ringing generators to terminating or called stations, detect off hook conditions (ring-trip) of the called station, and provide ring-back tone for the calling station. Each line circuit can be connected to any of a plurality of ringing controls which are accessed from a trunk link network (TLN) 52 so that a ringing control is automatically connected to the terminating line circuit as soon as a connection to that line is complete.

A line scanner and marker circuit 50 continuously checks the line circuits for an off hook condition, and is used for both originating and terminating types of traffic. In the event of originating traffic, the line scanner stops when an off hook condition is detected and transmits the information from its counter circuits to a makrer circuit to mark the particular line circuit and enables the SLN control 33 to initiate a path finding operation between an available local register and the line circuit requesting service. In the event of terminating traffic, the line scanner is controlled by the number and code translator 46 so as to receive an equipment number from the translator to mark the line circuit with the particular equipment location. Furthermore, in terminating traffic, the line marker is also involved in transmitting the terminating subscriber classes of service, ringing code, busy or idle status, and types of ringing required through tHe junctor control 34 to the ringing control 34. The line scanner-marker circuit 50 is more fully described in copending U.S. application Ser. No. 101,091, now U.S. Pat. No. 3,699,263 in the names of Gunter Neumeier and Otto Altenburger, which is assigned to the same assignee as the present invention.

The trunk link network (TLN) 52 provides for the termination of the local traffic to local subscribers, the termination of incoming calls from other exchanges to the local subscribers, and for the connection of incoming calls from other exchanges to other external exchanges. The TLN 52 includes a three stage network. When further expansion is necessary, another stage can also be includes. A D stage of the matrix is the entrance to the TLN and is connected to the local junctors 26 and 28. An F stage is the output or exit of the TLN an is connected via the ringing controls to the line link network 24 and also to the trunk circuits.

Path finding through the trunk link network 52 is performed under the control of the TLN control 51 and the junctor control 30. The TLN control 51 and the junctor control 30 work together in completing the termination portion of a call, whether it is an internally terminated call, or an outgoing call to a distant office. The number and code translator 46 and line scanner-marker 50 are used to complete calls to local lines, and the number-code translator, together with the outgoing trunk marker 48 complete calls to the trunks. The outgoing trunk marker 48 is fully described in a copending U.S. Patent application entitled, "Outgoing Trunk Marker" Ser. No. 103,267, filed on Dec. 31, 1970 for Otto Altenburger and David Stoddard and assigned to the same assignee as the present invention.

The path finding scheme of the TLN control 51 includes a two-step scan. The junctor has been previously marked, and furthermore, the information in the local registers is transmitted via the register common 44 to the number-code translator 46 at this time. In the event of a call terminating to a local subscriber, the number-code translator via the line scanner-marker circuit marks the line circuit of the terminating call. In the event of an outgoing call, the number-code translator via the outgoing trunk marker circuit marks the particular trunk circuit.

The path finding sequences through the SLN and the TLN along with the equipment associated therewith are more fully described in copending U.S. application Ser. No. 153,221, now U.S. Pat. No. 3,729,593 in the name of Otto Altenburger and Robert Bansemir, which application is assigned to the same assignee as the present invention.

Looking now to the portion of the system illustrated in FIGS. 2 and 3, which includes the private branch exchange (PBX) portion, five types of trunk circuits may be provided in the telephone system of the present invention; however, only an incoming/outgoing trunk 60 providing direct inward and direct outward dialing, an attendant trunk 62, and access trunk 64 are illustrated. The access trunks 64 are used solely by the operators to originate calls to the subscriber stations; while, the attendant trunks 62 are used by the local stations for access to the operator, from which they can be extended to another trunk or local station. The incoming-/outgoing trunks 60 interface the telephone exchange with distant offices. Each of the incoming/outgoing trunks 60 and attendant trunks 62 have port appearances at both the originating and terminating ends of the trunk link network 52, while the access trunks 64 have two line port appearances only on the originating ends of the trunk link network. The outgoing trunk marker 48 is connected to each of the incoming/outgoing trunks 60 and attendant trunk 62 and serves to select a trunk circuit for a call originated by one of the local subscribers in response to the dialed digits as analyzed by the number and code translator 46. The incoming/outgoing trunk 60 is fully described in our copending U.S. Patent application entitled, "Universal Trunk For PABX", Ser. No. 293,571 filed jointly herewith and which is assigned to the assignee of the present patent application.

An operator service link network (OSLN) 68 controlled by an OSLN control 58 is provided for connecting the trunks 60, 62, and 64 to various service circuits such as the dial pulse acceptors 70–72, transfer circuits 75–76 and loop circuits 78–84. The operation of the OSLN 68 and the OSLN control 58 and the method of signalling through the OSLN Is fully described in two copending U.S. Patent applications entitled, "Path Finding System For A Multistage Switching Network", now U.S. Pat. No. 3,729,591 in the name of Klaus Gueldenpfennig and Stanley L. Russell and, "Telephone Switching Network Signalling System", now U.S. Pat. No. 3,707,140 in the name of Klaus Gueldenpfennig, Stanley L. Russell and Uwe A. Pommerening, both of which patents are assigned to the assignee of the present patent application. The loop circuits 78–84 are separated into two groups 78–80 and 82–84, the former being connected to an operator console 104 via a position circuit 88 and the latter being connected to another operator console 106 via a position circuit 90. The loop circuit groups 78–80 and 82–84 are associated with rotaries 77 and 81, respectively, which serve to preselect an available loop for connection to the associated position circuit in preparation for a request for connection from a trunk to the operator console via its associated position circuit through the OSLN 68. The position circuits 88 and 90 are connected to the system timer 94 and trunk scanner 89 forming the common control for the PBX portion of the system, and the position circuits 88 and 90 also are directly connected to dedicated incoming registers, such as 40 and 42 respectively, associated with the register common 44 and number and code translator 46 in the ESC portion of the system. If it is desired to avoid dedicating registers to any single piece of equipment as in the foregoing manner, then alternatively the position circuits 88 and 90 can be connected to the local registers such as 34 and 36 through the SLN 32 as indicated in FIG. 1 by the dashed lines 89. The position and loop circuits form in part the operator loop complex used in establishing all calls to and from an operator via the OSLN 68 and the various type trunks.

A queue 96 is provided in association with the incoming/outgoing trunks 60 and attendant trunks 62 to provide for servicing of requests for the operator on a first come-first served basis. The operation of the queue 96 is fully described in our copending U.S. Patent application entitled, "Queue For Electronic Telephone Exchange", Ser. No. 108,380, now U.S. Pat. No. 3,702,380 assigned to the assignee of the present application. The queue 96 is connected between each of the incoming/outgoing and attendant trunks and the trunk scanner 89 and serves to forward to the trunk scanner 89 the request for operator signals as they appear at the output of the queue in conjunction with the scanning of the particular trunk by the trunk scanner 89. The trunk scanner 89 scans each of the incoming/outgoing trunks 60, attendant trunks 62, and access trunks 64 in sequential order and is stopped in its scanning on a particular trunk upon receiving a request for service signal in connection with that trunk. The request for service signal may relate to a request for a loop circuit to serve an operator, a request for a transfer circuit, or the request for a DPA in connection with a direct inward dialed call. A requested service circuit is available when the request is received in the trunk scanner 89, a stop scan signal will be generated and the request for service signal will be forwarded to that service circuit.

A call to or from an operator is made through one of the position circuits 88 or 90 and one of the loops 78–80 or 84–86 associated respectively therewith. Each such connection as well as each connection to one of the transfer circuits 75–76 and DPA circuits 70–72 is under the control of the system timer 94 and the trunk scanner 89. The system timer 94 provides sequential enabling time slots each slot comprising an individual pulse which is applied to a different one of the foregoing service circuit groups, the sequences being continuously repeated without stop. A matrix connection to a service circuit is posisble only while its respective group is enabled by the application thereto of its assigned time slot. For instance, a loop circuit such as 78 can be connected to a trunk only while its associated position circuit 88, in this case, is enabled during time slot sequences. Another enabling time slot would be provided for position circuit 90 as well as another one for every other position circuit in the system, there being as many position circuits as operator consoles. The trunk scanner 89 responds to service circuit requests from the trunks by first stopping its scanning operation at a trunk generating such a request, applying a mark signal to the trunk and applying a request signal to the appropriate service circuit groups. The arrangement is such that a connection between a service circuit and a trunk requesting connection to that type of service circuit is enabled only during the enabling time slot assigned to that particular service circuit group while a request signal is applied thereto. This arrangement is fully explained in the copending application entitled, "Private Automatic Branch Exchange Service Circuit Complex", previously referred to.

Figure 4:
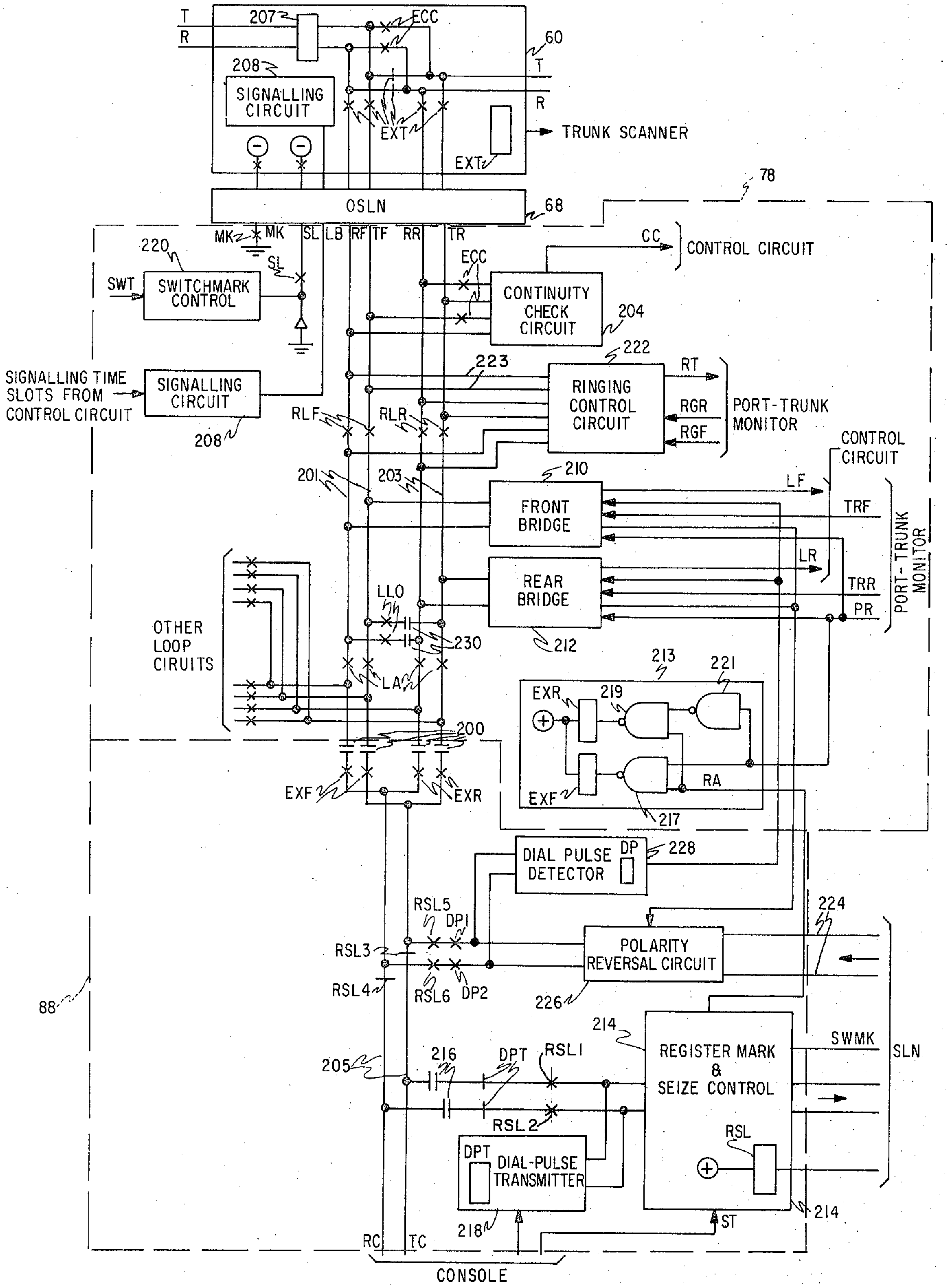
FIG. 4 is a schematic block diagram of the operator loop complex including an operator position circuit and a single loop circuit associated therewith connected to a trunk.

As shown in FIG. 4, each loop circuit such as 78 is connected to a trunk such as the incoming/outgoing trunk 60 via seven leads through the OSLN 68. The trunk 60 includes an extend relay EXT which is deactuated (or if desired may be actuated, in which case obvious modifications to the description hereinafter would be necessary) to interconnect two telephone subscribers directly via the telephone transmission pair comprising the tip and ring conductors T and R. The operation of the incoming/outgoing trunk 60 including the extend relay EXT is fully explained in our aforementioned copending application Ser. No. 293,571. At this time, the loop circuit 78 and trunk 60 are completely disassociated. While the trunk 60 and loop 78 are connected, the extend relay EXT is energized so that the tip and ring conductors shown entering the trunk 60 from the left are connected to a pair of conductors in the loop circuit 78 designated TF (tip front) and RF (ring front) respectively, and the tip and ring conductors in the trunk 60 entering from the right are connected to a pair of conductors in the loop circuit 78 designated TR (tip rear) and RR (ring rear), respectively. The conductors TF and RF form a front transmission pair 201 and the conductors TR and RR form the rear transmission pair 203 of the loop circuit 78 while their connections to the tip and ring conductors T and R on the trunk 60 are designated as being made on the front and rear ports respectively. While the EXT relay is energized (normally open contacts being shown as crosses, while normally closed contacts are shown as dashes) the only connection between the tip and ring conductors T and R from the front and rear ports in the loop circuit 78 is via the front and rear transmission pairs 201 and 203 through the transmission capacitors 200 and three sets of relay contacts which will be explained later. When the three sets of relay contacts are all closed, the front and rear transmission pairs 201 and 203 are connected together as well as to the operator console via the tip and ring conductors TC and RC which form a console transmission pair 205. When the normally closed contacts designated RSL 3 and RSL 4 are closed, a telephone path is present from the operator console through both the front and rear transmission pairs 201 and 203 through the OSLN 68 to the front and rear ports of the trunk 60. Consequently, both telephone subscribers interconnected via the tip and ring conductors T and R through the trunk 60 and the operator can converse with one another. If the operator wishes to speak with one party and not the other, two pairs of exclude contacts EXF and EXR permit either the front or rear transmission pairs 201 and 203 to be opened, while the other one remains closed.

Figure 5:
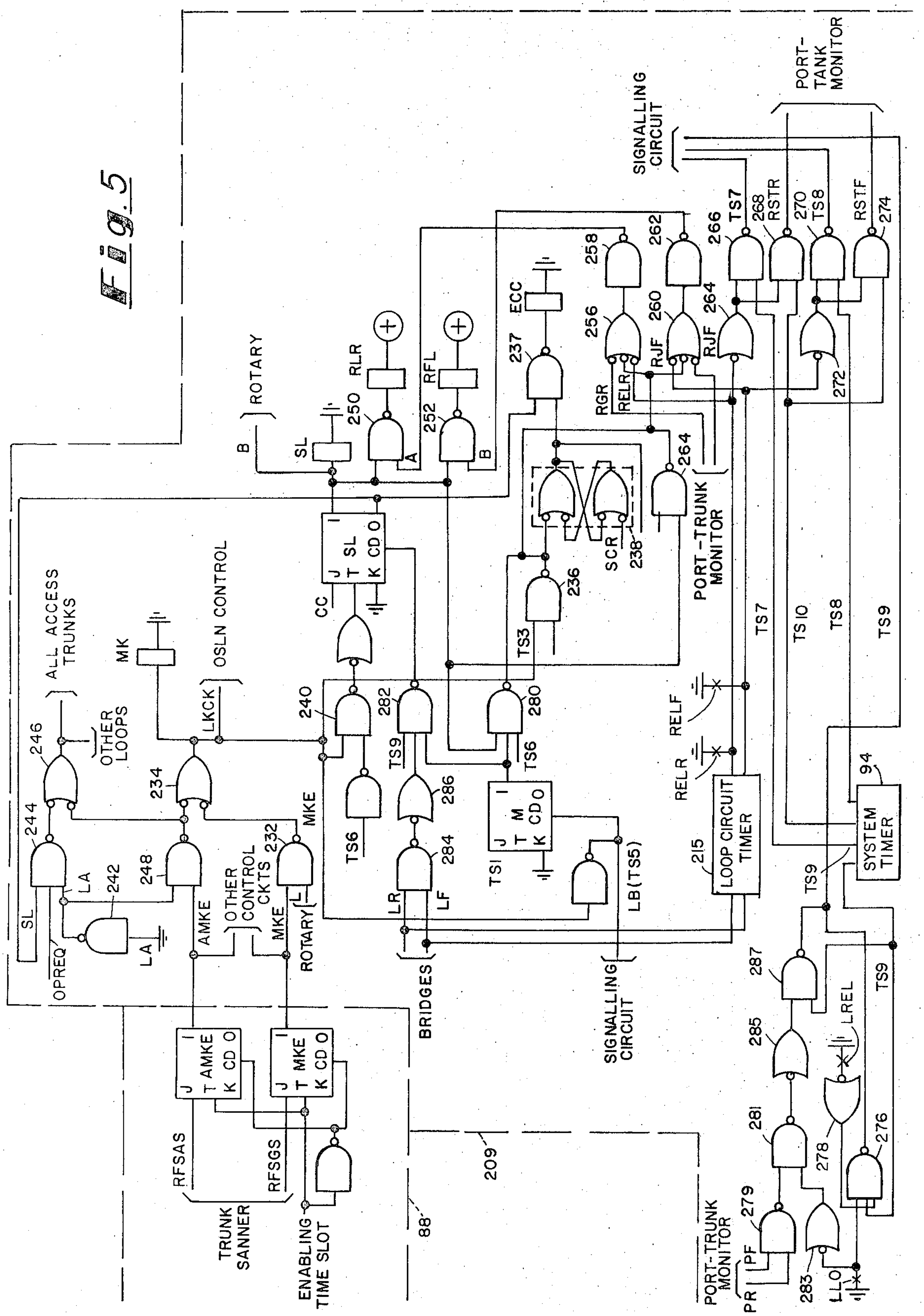
FIG. 5 is a schematic block diagram of the control circuit used in the loop circuit.

The connection between the trunk 60 and loop circuit 78 is implemented by a ground signal applied to the OSLN 68 via a mark lead MK through actuated contacts MK (a cross means normally open contacts when the associated relay is deenergized) under the control of mark relay MK located in a control circuit 209 which supplies the various signals for controlling functions in the loop circuit 78 and which is shown in detail in FIG. 5. The mark lead MK terminates in the trunk 60 on the ungrounded terminal of a grounded battery supply connected to the OSLN 68 by the trunk scanner 89 which is stopped at that particular trunk, in response to a service request for an operator by the trunk. The two mark singals simultaneously generated in the trunk 60 and loop circuit 78 enables a path to be marked through the OSLN 68 for interconnecting the two. This marking operation is enabled only during the enabling time slot applied to the position circuit 88 from the timer 94 while the trunk scanner 89 also applies a request signal thereto. Once a path through the OSLN 68 is marked, a continuity check circuit 204 including any device normally used for that purpose, such as a core sensor, relay, etc. is connected across the front and rear transmission pairs 201 and 203 by the closing of the contacts ECC (enable continuity check) which are under the control of an enable continuity check relay ECC located in the control circuit 209. At this time the contacts RLF and RLR are open. If a continuous transmission path is found via both the front and rear transmission pairs 201 and 203 through the OSLN 68, to a bridge 207 in the trunk 60, a signal indicating the same is applied to the control circuit 209 via the lead CC. At this time the normally open EXT contacts are closed, and a pair of contacts ECC are closed to permit the rear pair to be connected to the bridge 207 for the continuity check. The signal enables a sleeve relay in the control circuit 209 to close the normally open contacts SL thereby applying a ground to the sleeve lead SL through the OSLN 68 or holding the connection between the loop 78 and the trunk 60. After the connection is established, supervisory control signals are transmitted back and forth through the OSLN 68 between the trunk 60 and loop circuit 78 via a lead LB which is connected on both ends to signalling circuits 208 used for coordinating the signalling. These signals are derived from the system timer 94 in the form f sequential signalling time slots, similar to the enabling time slots except that there are eleven of these enabling time slots, the last one being a reset signal SSR. The same signalling time slot is applied to the same piece of equipment in each and every successive enabling time slot. This is explained in detail in the copending application entitled, "Private Automatic Branch Exchange Service Circuit Complex", previously referred to.

The loop circuit 78 comprises a front bridge 210 connected across the front transmission pair for monitoring loop conditions therein. Thus when a DC loop is detected back through the OSLN 68 to a transmission path connected to the front port of the trunk 60, the front bridge 210 applies a singal LF (loop front) to the control circuit 209 for supervisory purposes. The loop detection can be made by any suitable device placed across the conductors RF and TF such as a core sensor, a relay, etc., so that it is actuated by the flow of DC current whenever a loop exists. The front brigge 210 also provides the transmission battery to a telephone subset connected to the front port of the trunk 60 when the subscriber is a local party within the private exchange. When the aforementioned subscriber is located in another exchange then the transmission battery is disconnected from the front transmission pair 201 by the front bridge 210 since it is not required. The disconnection of the transmission battery from across the front transmission pair 201 is made in response to a TRF signal (trunk on front) from a port-trunk monitor. The port-trunk monitor, which is shown in detail in FIG. 6, monitors the transmission paths connected to the front and rear ports of the trunk 60. When an interfacing trunk is connected to the front port it is detected by the port trunk monitor 212 which indicates the same to the front bridge 210, see FIG. 4, by means of the TRF signal. The foregoing is also true with respect to a rear bridge 212 which is connected across the rear transmission pair 203 of loop 78. The rotary is fully explained in the copending application entitled, "Private Automatic Branch Exchange Service Circuit Complex", previously referred to. To connect the loop for handling the call, the operator merely actuates the button associated with the loop circuit whose signal lamp is flashing.

To place a telephone call once the loop circuit 78 is connected to a trunk, the operator actuates a start key (not shown) on the console which applies a singal ST to a register mark and seize control circuit 214 indicating that the operator wants a register. The register mark and seize control 214 is connected to the service link network 32 and is designed to simulate a normal telephone line circuit so that upon receipt of the signal ST it applies a signal to the SLN 32 indicating a normal service request. In customary fashion, one of the local registers 34–36 is connected to the register mark and seize control 214, the connection being indicated by the return of a ground signal to operate a relay RSL. This closes contacts RSL1 and RSL2 connecting the console transmission pair 205 to the register via the transmisison capacitors 216. While connected to the register, the console transmission pair 205 is disconnected from the front and rear transmission pairs 201 and 203 of the loop circuit 78 by the opening of contacts RSL3 and RSL4. Tone dial signals are applied to the register from the operator console via the console transmission pair 205 and the transmission capacitors 216. If the telephone subset utilizes rotary dialing then the dial pulses are applied to the register via a dial pulse transmitter 218 through a separate lead from the console so that the dial pulses are not distorted by the transmission capacitors 216. A pair of contacts DPT controlled by a relay DPT in the dial pulse trasmitter 218 are opened at this time for that purpose. If the operator is calling a local telephone within the private branch exchange, the register merely processes the called digits in normal ESC fashion to effectuate a connection between the trunk and the local called station. Once all the called digits are received in the number and code translator 46, a switchthrough signal SWT from the translator 46 is applied to a switchmark control circuit 220 which superimposes on the sleeve lead SL a positive potential which is passed through the OSLN 68 to the trunk 60 for cutting through the connection. At this point the RSL contacts are restored to the normal condition and ringing is applied to the called station by either the ringing control circuit in the ESC connected in the telephone or by an optional ringing control circuit 222 located in the loop circuit 78. The optional control circuit 222 provides the usual busy monitor and busy verification features available to the branch exchange operator without the need for modifying the ringing control circuits in the ESC. These features permit the operator to ascertain that a called party is already engaged in another telephone conversation and if desired, to cut in on that conversation. When the optional ring control circuit 222 is used for ringing the called party a signal is applied to the ESC ring control circuit in the telephone path to inhibit its operation. The ring control circuit 222 applies the ringing signal to the appropriate transmission pair in the loop circuit 78 in response to signals from the port trunk monitor (FIG. 6) indicating the transmission pair over which the call to the local subscriber is being made. An RGF signal (ring on front) indicates that the ringing signal should be applied to the front pair 201 via leads 223 while an RGR (ring on rear) indicates tht the ringing signal should be applied to the rear transmission pair 203. While ringing is being applied to a transmission pair, a pair of release contacts RL (RLF for the front transmission pair 201 and RLR for the rear transmission pair 203) are opened to prevent the ringing signal from being passed back through the console transmission pair 205 to the operator telephone subset. The ringing control circuit 222 also provides ringback tone to the appropriate ring conductor at this time. When the call is answered, it is detected by the usual ring trip circuit in the ring control circuit 222 which provides a ring trip signal RT which is applied to the port trunk monitor (FIG. 6) for supervisory purposes. When a call is made to a subscriber in a distant exchange, the ring control circuit 222 is prematrely tripped to inhibit the ringing signal since in this case the ringing signal is always provided by the distant office.

Figure 6:
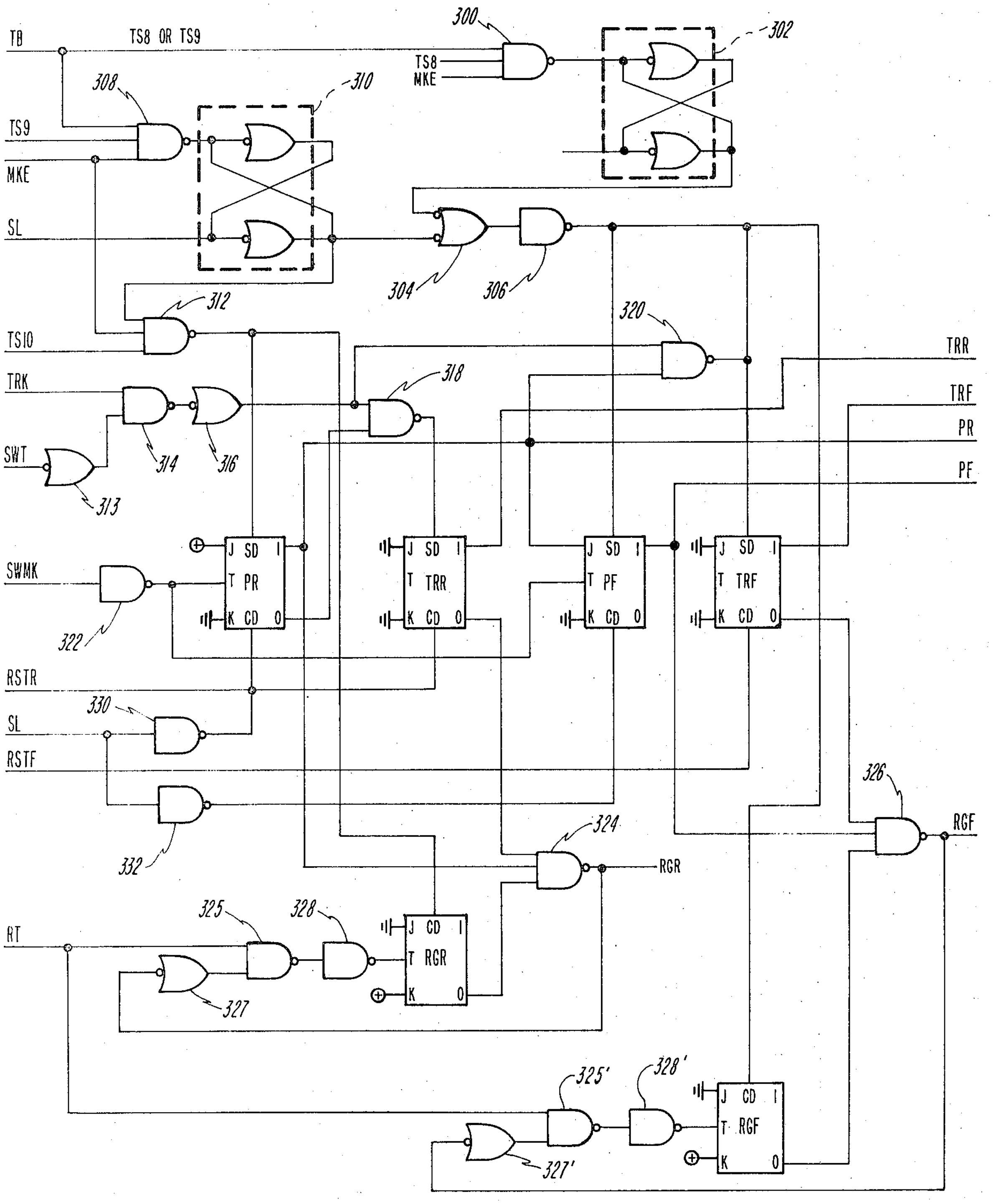
FIG. 6 is a schematic block diagram of the port trunk monitor used in the loop circuit for monitoring the connections through the trunk.

If the operator is placing a call to a subscriber in a distant exchange then register outpulsing may be required. This is done by means of the outpulsing leads 224 which are connected to the register. While the register is connected to the position circuit 88 the relay RSL remains operated so that contacts RSL3 and RSL 4 remain open disconnecting the console transmission pair from the front and rear transmission pairs 201 and 203 of loop circuit 78. At this time however, contacts RSL 5 and RSL 6 and a pair of contacts DP1 and DP2 are closed so that the outpulsing leads 224 are connected to the front and rear transmission pairs 201 and 203 of the loop circuit 78 through a polarity reversal detection circuit 226. The polarity reversal detection circuit 226 is controlled by either the front bridge 210 or rear bridge 212 dependent upon over which of the two transmission pairs the call is being made as which is indicated by a signal PR (port rear) from the port trunk monitor (FIG. 6). The signal PR is also applied to an exclude circuit 213 which controls the exclude contacts EXF and EXR so that while a register is attached to the position circuit 88 as indicated by a signal RA from the register mark and seize control 214, the pair of exclude contacts EX in the transmission pair over which outpulsing is to take place is closed while the other pair of exclude contacts EX is open. It is readily seen that if PR is high relay EXF is energized via gate 217 and if PR is low relay EXR is energized via gate 219 and inverter 221. Consequently, multifrequency signals outpulsed by the register via the outpulsing leads 224, the polarity reversal detection circuit 226, closed contacts RSL 5 and RSL 6 and DP contacts 1 and 2 are applied to only one transmission pair via the closed exclude contacts EX while being prevented from being applied to the control transmission pair by virtue of the open contacts EC. This is done so that if a party should already be connected to one transmission pair while outpulsing is being applied to the other transmission pair the multifrequency signals cannot be applied to the telephone subset of the connected party. Since outpulsing to a distant office cannot begin until the equipment in the distant office is connected to receive the outpulsed signals, various schemes involving momentary interruptions of line potential or polarity changes in line potential under the control of the distant office are used in the private branch exchange for inhibiting outpulsing until the appropriate time. These voltage conditions are detected either in the front or rear bridges 210 or 212 dependent on the transmission pair over which outpulsing is to be applied and are passed on to the polarity reversal detection circuit 226 for controlling the outpulsing from the register connected to the outpulsing leads 224.

A dial pulse detector circuit 228 is used when outpulsing is done with dial pulse rather than multifrequency signals. Upon detecting the first dial pulse in the outpulsing sequence a DP relay in the dial pulse detector 228 is energized to open the normally closed DP contacts DP1 and DP2, thus bypassing the transmission capacitors 200 and preventing distortion of the dial pulses. The dial pulse detector circuit 228 applies the dial pulses to either the front bridge 210 or the rear bridge 212 dependent on its transmission pair over which the call is being made, determined by the signal PR applied to both bridges. The appropriate bridge then repeats the dial pulses to its connected transission pair. Of course, during outpulsing, the contacts RL are closed to permit the signals to be passed on to the interfacing trunk.

Once two telephone subscribers are interconnected via the trunk 60 the operator has the option of releasing from the call in two ways. The operator may "loop release" in which case the loop circuit 78 is disconnected completely from the trunk 60 so that it is available for use in establishing another telephone connection to the operator. In this case, the extend relay EXT in the trunk 60 is deenergized so that the two subscribers are connected together directly through the trunk circuit 60. After loop releasing, the operator has no way of reestablishing a connection to the trunk 60. The operator may also "operator release" in which case a relay LLO (lock loop) is actuated to close the LLO contacts placing a direct connection across the front and rear transmission pairs 201 and 203 via transmission capacitors 230 before contacts LA are opened. In this case, the extend relay in the trunk 60 remains energized so that the two subscribers are interconnected via the loop circuit 78 only. Although in both loop release and operator release cases the LA contacts are open, in the latter case closing of the LLO contacts allows the console transmission pair 205 to be reconnected to the front and rear transmission pairs 201 and 203, interconnecting the two subscribers wherein as in the former case no such connection is possible. By releasing from the call through operator release the operator monitors the connection between the trunk and the loop, which permits a local subscriber to signal for the services of that same operator by means of a hookflash. When a trunk is not connected to a loop such as after loop release, a hook flash from a local subscriber is detected in the trunk causing it to generate a service request for a transfer circuit for transferring the call if the local subscriber has a transfer calss of service. The subscriber may then dial 0 for an operator. In the event that the local subscriber has no transfer class of service, the trunk is programmed to generate service request for an operator. In both cases the local subscriber will be connected to the first available operator found in the common control system. In operator release however, the trunk is inhibited from generating a service request by its connection to the loop. A hook flash in this case is detected across the transmission path from the subscriber via one of the bridges 210 or 212 momentarily interrupting either the LF or LR signals. This is detected in the control circuit 209 which causes a lamp on the operator console to flash indicating that the operator is being recalled to the loop associated with the lamp. To respond to the call, the operator actuates the LA contacts for that loop.

The operator also has the option of dropping an individual transmission path to the loop circuit 78 via either the front or rear port. This is done by operating the release contacts RL in the transmission pairs associated with the port of the trunk 60 which the operator wishes to drop. With the exception of the control circuit 209 and the port trunk monitor, all of the components shown in FIG. 4 are well known in the art. It is therefore necessary only to describe the operation of the control circuit 209 and the port trunk monitor in detail to understand the novel features of the invention.

Referring now to FIG. 5 it will be seen that the position circuit 88 comprises two flip-flops, namely MKE (mark enable) and AMKE (access mark enable). Whenever the trunk scanner 89 is stopped at either an incoming/outgoing trunk 60 or an attendant trunk 62 requesting the services of an operator, it applies an RFSGS signal to the J input of all the MKE flip-flops in all of the position circuits thereby enabling the flip-flops to be set when properly toggled by an enabling time slot applied to the T input. Since only one position circuit is enabled at a time, only one MKE flip-flop can be set at a time, that one being in the position circuit to which the enabling time slot is first applied after generation of the RFSGS signal by the trunk scanner 89. The set MKE flip-flop in the enabled position circuit applies the MKE signal via it one output to a gate 232 located in the control circuit 209. Although this signal is simultaneously applied to the counterpart gates 232 in each of the other control circuits for each of the other loop circuits, only one gate 232 is enabled to pass the MKE signal by virtue of an enabling signal L applied to the gate from the associated rotary. The signal L is applied to only one gate 232 in all of the control circuits 209 for preselecting the loop circuit which is to be used next in establishing a connection between the operator and a trunk requesting the services of the operator. The enabled gate 232 applies an enabling signal to a gate 234 the output of which energizes the MK relay to close the normally open contacts MK in the MK lead thereby marking the loop circuit for connection through the OSLN 68. It should be pointed out that the customary amplifier driver circuits for applying logic signals to relays have been omitted in the drawing only for the sake of simplicity and convenience, these amplifier circuits being well known and not necessary to an understanding of the operation herein. The output of the enabled gate 234 is also applied to the OSLN control 58, via the LKCK lead to enable a free path through the OSLN 68 to be found to interconnect the trunk and the loop circuit. The output of the gate 234 is gated with a signalling time slot 3 to momentarily enable a gate 236 to set a flip-flop 238 the output of which energizes the relay ECC (enable continuity check) through a gate 237 having another input which is enabled at this time. The actuation of relay ECC closes the normally open contacts ECC which connect the continuity check circuit 204 across the front and rear transmission pairs 201 and 203. If continuity is detected, the continuity check circuit 204 applies an enabling signal CC to the J input of a SL (sleeve) flip-flop thereby enabling it to be set. Signalling time slot 6 is gated with the output of NAND gate 234 via NAND gate 240 to toggle the SL flip-flop thereby setting it. The one output of the SL flip-flop energizes the SL relay causing the normally open contacts SL in the SL lead to close, applying ground to the OSLN 68 for holding the connection between the trunk and loop circuit. The one output of flip-flop SL is applied to the rotary via the BF lead to indicate that the preselected loop is now busy and to permit the rotary to resume running to find another free loop circuit for servicing a subsequent operator connection. The zero output of flip-flop SL is applied to gate 237 to disable it now so that relay ECC cannot be energized while there is a sleeve connection. It should be pointed out at this time that each time slot is sufficiently long, so that adequate time is permitted between the various operations so that the operations can be completed for applying the mark and sleeve signals and performing the continuity check. At this time the front and rear transmission pairs 201 and 203 are connected to the trunk requesting service of the operator and a flashing lamp at the operator console so apprises the operator. To respond to the call, the operator merely connects the console transmission pair 205 to the front and rear transmission pairs 201 and 203 by actuating the LA relay which closes the LA contacts in that particular loop circuit. A calling subscriber then indicates to the operator what he wants so that the operator can comply with the request.

The operator may initiate a call by selecting any idle loop circuit by actuating its associated LA relay. This applies a ground through an inverter 242 to a three input gate 244. A second input to the gate 244 is for operator service request signal and is provided in order to prevent an operator from initiating a call by disabling the gate 244 whenever there is a request for an operator from either an incoming/outgoing trunk 60 or an attendant trunk 62. The third input to the gate 244 is taken from the zero output of the SL flip-flop to prevent the operator from marking a loop circuit that is already busy. If a loop circuit selected by the operator is idle, the SL flip-flop will be reset so that its zero output will be high thereby enabling gate 244, if the loop circuit is busy the SL flip-flop will be set so that the zero output will be low thereby disabling the gate 244. Assuming that there are no operator requests outstanding and that the operator has selected in idle loop circuit, the gate 244 applies an enabling signal to a gate 246, the output of which is applied to all access trunks via a bus which is common to all loop circuits. Upon receipt of this output all idle access trunks generate a service request to the trunk scanner 89 so that the first idle access trunk scanned by the trunk scanner 89 stops its scanning operation. In response thereto the trunk scanner 89 generates an RFSAS signal which is applied to all the AMKE flip-flops in all the position circuits.

When the position circuit of the operator who is selecting a loop circuit is enabled via its assigned enabling time slot, the AMKE flip-flop is set. Its output is applied to a gate 248 which is partially enabled by the output from the inverter 242 thereby enabling the gate 234 to energize the MK relay marking the loop circuit which the operator selected. Since the trunk scanner 89 can only generate one type of request signal (such as RFSAS or RFSGS) at a time, it is not possible to set both the AMKE and MKE flip-flops simultaneously so that only one loop circuit can be marked at a time. Once marking takes place the continuity check and sleeve operations for connecting an access trunk to the loop circuit is the same as previously described.

The one output from the SL flip-flop is also applied to two gates 252 and 250. These two gates are respectively connected to an RLF relay and a RLR relay for controlling the RL contacts in the front and rear transmission pairs 201 and 203. As long as no disabling signalling is applied to the gate 250 via the A lead and the gate 252 via the B lead, relays RLR and RLF will be operated thereby connecting the bridges 210 and 212 to the telephone leads into the OSLN 68. Lead A is connected to a gate 256 through an inverter 258 and lead B is connected to another gate 260 through an inverter 262. Each of the gates 256 and 260 has three inputs. Whenever a ground signal is applied to one of the three inputs the gate is enabled to apply a ground signal via its associated lead (A or B) to disable the associated gate thereby deenergizing the associated RL relay. For example, when ringing is applied on the rear transmission pair 203, the port trunk monitor (FIG. 6) applies a ground signal RGR to the gate 256 thereby disabling gate 250 and deenergizing the relay RLR. With the RLR contacts open the ringing signal cannot be applied back through the console transmission pair 205 to the operator telephone subset as previously mentioned. If the operator wishes to forcibly release the rear port in the trunk, a button on the console is actuated which closes contacts RELR applying a ground to gate 256 via the RELR lead also causing the RLR relay to be deactuated. The third input to the gate 256 as well as to the gate 260 is derived from the output of a gate 264 having an input connected to the one output of the SL flip-flop and the other input connected to the one output of the flip-flop 238 used initially to operate the ECC relay. Once the SL flip-flop is reset by the SCR signal, the gate 264 is disabled also disabling the gates 256 and 260 so that relays RLR and RLF are operated and the front and rear transmission pairs 201 and 203 are completely cut through from the console transmission pair 205 to the connected trunk circuit.

Once a connection is established between a trunk and loop circuit, supervisory signals are passed back and forth therebetween via the LB lead through the signalling circuits 208 for permitting transmission paths to the front and rear ports of the trunk to be selectively dropped as well as for dropping the sleeve holding the trunk to the loop circuit. For instance, if the operator wishes to forcibly release the transmission path on the rear port only, the operator closes contacts RELR which applies a ground to gate 256 causing the RLR contacts to open. This ground is also applied through an inverter 264 to a gate 266 having a second input to the system timer 94. The system timer 94 applies signalling time slot 7 to the gate 266 via its second input. When the gate 266 is partially enabled by virtue of the ground signal being applied through the RELR contacts, signalling time slot 7 is passed on through the signalling circuit, on to the LB lead, through the OSLN 68 to the connected trunk. The trunk is programmed so that when it receives signalling time slot 7 on the LB lead, it releases whatever equipment is connected to its rear port. While gate 266 is enabled, another gate 268 is also enabled to pass signalling time slot 10 from the system timer on to a lead designated RSTR (reset rear) which is applied to the port trunk monitor (FIG. 6) for supervisory purposes to be explained later. If the operator wishes to release the transmission path on the front port, the operator closes contacts RELF applying a ground signal to the gate 260 causing contacts RLF to open. This ground signal is also applied to a gate 270 through an inverter 272 to partially enable the gate 270. The gate 270 has a second input connected to the system timer over which signalling time slot 8 is applied and which is passed on through the signalling circuit while gate 270 is partially enabled. Signalling time slot 8 is applied through the signalling circuit to the LB lead, through the OSLN 68 to the connected trunk. The trunk is programmed so that upon receipt of time slot 8 it releases whatever equipment is connected on its front port except in the case of an incoming/outgoing trunk which cannot release the outside world. The partially enabled signal which is applied to gate 270 is also applied to a gate 274 so that it is enabled to pass time slot 10 via a lead RSTF (reset front) on to the port trunk monitor for supervisory purposes. The selective release of a port call also occurs automatically if the party connected to that port hangs up. In such case, the absence of a DC loop is detected in the loop circuit timer 215 via the absence of a ground on either the LR or LF. After a time out period has run indicating that the party has hung up and has not hook flashed as described previously, the timer 215 applies a ground to the RELR or RELF lead dependent on which port the loop was dropped to, automatically releases that port.

If the operator wishes to loop release to disconnect the loop circuit from the trunk, the operator actuates a button which closes contacts LREL to apply an enabling signal to a gate 276 via an inverter 278. The gate 276 has a second input connected to the system timer 94 over which signalling time slot 9 is applied thereto. A third input is connected to ground through the normally open contacts LLO. As long as the loop circuit is not in lock loop (LLO contacts are open) the closing of contacts LREL enables the gate 276 to pass time slot 9 on to the signalling circuit 208 and through the OSLN 68 via the LB lead to the connected trunk circuit. Time slot 9 will automatically be passed on to the signalling circuit 208 whenever the loop circuit is in lock loop (LLO contacts closed) and one of the two interconnected subscribers hangs up. In this case, a gate 279 is enabled by a ground signal on either the PF or PR input from the port trunk monitor (FIG. 6) indicating the absence of at least one complete transmission loop across a trunk port. The output of gate 279 is applied to another gate 281 together with the output of an inverter 283 which is present whenever the LLO contacts are closed indicating a lock lamp condition. The output of gate 281 is applied through an inverter 285 to a gate 287 which is momentarily fully enabled thereafter by the application of time slot 9 from the system timer 94.

The application of signalling time slot 9 to the trunk causes the extend relay EXT to be deactuated. Whenever the relay EXT is operated indicating a connection between a trunk and a loop circuit, the trunk circuit is programmed to send signalling time slot 5 to the connected loop circuit via the LB lead. Whenever the relay EXT is deactuated indicating the absence of a connection between a loop circuit and a trunk, the trunk circuit is inhibited from sending signalling time slot 5 to the loop circuit. Consequently, when signalling time slot 5 is not received in the loop circuit via the LB lead from the trunk circuit, it means that the holding sleeve between the trunk circuit and the loop circuit is to be dropped. When the sleeve is subsequently dropped, the path through the OSLN 68 connecting the trunk and loop circuits is physically opened by the opening of the various contacts located in series with each of the various leads. These contacts, in most cases, are not designated for interrupting of loop current so that it is important that there be no loops present through the OSLN 68 before the sleeve is acutally dropped. For this reason, any of the bridges 210 or 212 connected across the front and rear transmission pairs 201 and 203, as well as any bridges located in the trunk circuit, such as 207, must be opened prior to dropping the sleeve. The bridges on the loop circuit are dropped by the opening of the RL contacts as already described. Time slots 7 and 8 open the trunk bridges for dropping the front and rear ports respectively. Signalling time slot 9 going to the trunk will initiate the opening of the bridges therein while the absence of signalling time slot 5 coming back to the loop circuit will initiate the opening of the bridges therein followed by the removal of the sleeve.

A monitor flip-flop M is set by the application of signalling time slot 1 to its toggle lead T and reset by the application of signalling time slot 5 over the LB lead to its direct reset lead. The one output of the M flip-flop is applied to a gate 280 having a second input derived from the one output of the SL flip-flop so that in the presence of a sleeve connection the gate 280 is partially enabled. A third input to the gate 280 is connected to the system timer 94 over which signalling time slot 6 is applied. The output of gate 280 is connected to both gates 256 and 260 so that when it is enabled the gates 256 and 260 apply disabling signals to the gates 250 and 252 deenergizing the RLR and RLF relays and opening the RL contacts so that bridges 210 and 212 are no longer connected to the OSLN 68. Gate 280 will be enabled by time slot 6 only if the M flip-flop is not reset by the application of time slot 5 thereto before signalling time slot 6 is applied to it. Consequently, if the sleeve is not to be dropped, signalling time slot 9 is not set to the trunk and signalling time slot 5 as a result is returned over the LB lead to reset the M flip-flop before signalling time slot 6. If the sleeve lead is to be dropped by sending time slot 9 to the trunk, then signalling time slot 5 will not be received over the LB lead to reset the M flip-flop. Consequently, the M flip-flop will remain set, enabling gate 280 to pass time slot 6 removing the front and rear bridges 210 and 212. Since the gate 280 is only momentarily enabled by the time slot 6 pulse, its output is applied to the set input of flip-flop 238, the set output of which is applied to the input of gate 264 together with the one output of the SL flip-flop to apply a constant ground signal to the gates 256 and 260. The one output of the M flip-flop is also applied to a gate 282 which has a second input from a gate 284 via an inverter 286. The inputs to the gate 284 are the LR and LF indications from the front and rear bridges 210 and 212 monitoring the loop conditions on the front and rear transmission pairs 201 and 203. So long as these indications are high indicating the absence of a loop on either pair the gate 282 is partially enabled. Consequently, when signalling time slot 9 is applied as a third input to the gate 282, the SL flip-flop is rest thereby deenergizing the SL relay and dropping the sleeve lead. Although the time between the onset of time slot 6 for inhibiting removal of bridges 210 and 212 via gate 280 and the onset of time slot 9 applied to gate 282 for dropping the sleeve is designed to avoid interrupting current in the OSLN 68, the partial enabling of gate 282 via gate 284 is an additional precaution to avoid the same. If there is a loop across either transmission pairs, front 201 or rear 203, which would be indicated by a ground on either LF or LR, gate 282 will be disabled from resetting the SL flip-flop it drops the sleeve lead which would otherwise open the contacts in the OSLM 68 to break loop circuit.

As indicated eariler, the port trunk monitor (FIG. 6) provides signals for routing the ringing signals and outpulsing signals to the appropriate transmission pair in the loop circuit 78. To accomplish this the port trunk monitor monitors the ports of the connected trunk through three individual flip-flops associated with each transmission pair as shown in FIG. 6. The trunks are so arranged that in the case of an access trunk 64 for permitting an operator to initiate a call, the first connection to a subscriber is made via the rear transission pair 203 and the rear port of the access trunk 64. In the case of an attendant trunk 62 for permitting a local party within the exchange to call an operator, the call is routed via the rear transmission pair 203 and the rear port of the attendant trunk 62. Only in the case of the incoming/outgoing trunk 60 involving an operator call is the front transmission pair 201 in the loop circuit 78 used before the rear transmission pair 203. From the foregoing, it can be seen that with the exception of the incoming/outgoing trunk 60 the rear port of a trunk (together with the rear transmission pair 203 of the loop circuit 78) is always favored, that is to say, occupied first before the front port. This fact is set in routing the ringing and outpulsing signals.

The port trunk monitor, see FIG. 6, comprises a PF (port front) flip-flop and a PR (port rear) flip-flop which are set whenever their respective ports in the connected trunk are occupied. These flip-flops cannot be set by toggling until after a switch mark SWMK from the register in the SLN 32 is removed which occurs simultaneously with the SWT signal for a call to a local subscriber and occurs after the completion of outpulsing, if required, for a call to a distant exchange. The port trunk monitor also contains two flip-flops TRR (trunk on rear) and TRF (trunk on front) which are set whenever their respective ports in the connected trunk are connected through an interfacing trunk to a distant exchange. In the case of the incoming/outgoing trunk 60, its front port is always connected directly to a distant exchange and not through any interfacing trunk since the purpose of this trunk 60 is to provide an interface between the private branch exchange and a distant exchange. The rear port of the incoming/outgoing trunk 60, however, may be connected to an interfacing trunk in the case of a call between two distant exchanges which has been routed through the private branch exchange. The port trunk monitor also comprises two flip-flops RGR (ring on rear) and RGF (ring on front) which are used in conjunction with the other flip-flops to provide the signals for steering the ringing signal to the appropriate transmission pair in the loop circuit 78.

From what has been said previously, it is realized that whenever the incoming/outgoing trunk 60 is connected to a loop circuit 78, the front port must be occupied and must also be connected to a distant exchange. Consequently, in this case, both the PF and TRF flip-flops must be programmed set during OSLN marking. In the case of recall to an operator by a local party within the exchange who wishes the services of an operator, as to connect the outside party to another local party, both front and rear ports of the incoming/outgoing trunk 60 are occupied. In this case, the PR flip-flop must also be set as well as the PF and TRF flip-flops. To accomplish the foregoing, a bus TB from the connected trunk receives either time slot 8 indicating an outside call to an operator or time slot 9 indicating a recall by a local party. The TB bus is connected to a first gate 300 having two other inputs for receiving time slot 8 directly from the system timer 94 and the MKE enabling signal from the output of gate 232 shown in FIG. 5. Consequently, the gate 300 will be momentarily fully enabled when an incoming/outgoing trunk 60 is connected to the loop circuit by the coincident application thereto of the foregoing three signals indicating an outside call to the operator. The enabled NAND gate 300 sets a flip-flop 302, an output of which is applied through gate 304 and an inverter 306 to set flip-flops PF and TRF, via their direct set leads.

The TB bus is also connected to another gate 308 having two other inputs, time slot 9 directly from the system timer 94 and the MKE signal from the output of gate 232. When an incoming/outgoing trunk 60 is connected to the loop circuit and a recall has been made, time slot 9 via the TB bus and time slot 9 at the direct input to gate 308 will enable it to set a flip-flop 310, an output of which is also applied to the gate 304 to set flip-flops PF and TRF. The reset output of flip-flop 310 is also applied to a gate 312 which is further enabled by the presence of the MKE signal and the application of time slot 10 applied thereto from the system timer 94. The output of gate 312 is applied to the direct set input of flip-flop PR to indicate that the rear port is occupied. This output is not applied to the direct set lead of flip-flop TRR since the rear port may not be connected to an interfacing trunk for connection to the outside world. Indication of port connections to interfacing trunks in the case of the rear port for the incoming/outgoing trunk 60 and in the case of both ports for the access trunk 64 and attendant trunk 62 are received through a gate 314 at the time the switchthrough signal SWT from the translator for an individual port is received at gate 313, the latter occuring simultaneously with or prior to the SWMK signal. When an interfacing trunk is connected to a port it is so indicated by the ESC via an enabling signal on the TRK input to gate 314 so that gate 314 is fully enabled by the signal coincident with the SWT signal. The output of gate 314 is applied through an inverter 316 to a gate 318 to partially enable it. Since flip-flop PR is not yet set (which setting only occurs at the termination of the switch mark SWMK), the other input to gate 318 from the zero output of flip-flop PR will be high so that gate 318 will be fully enabled to set flip-flop TRR via its direct set lead. This occurs of course only if there is a trunk indication (via the TRK input to gate 314) applied to gate 320 so that when flip-flop PF is set the gate 320 is enabled. The other input to gate 320 is derived from the output of the inverter 316. Consequently, once the rear port is occupied and a call is made on the front port to a distant exchange via an interfacing trunk (for instance with the use of an access trunk) flip-flop TRF will be set via gate 320. This indicates an interface trunk call on the front port.

The one output of flip-flop PR is applied to the J input of flip-flop PF so that the latter cannot be set by toggling until flip-flop PR is set. Thus, at the termination of switch mark SWMK, the flip-flop PR is set first (before flip-flop PF) via the inverter 322 indicating that the rear port is now occupied. Upon the removal of a second switch mark SWMK indicating that a second connection is taking place the flip-flop PF will be set to indicate that the front port is now occupied. Consequently, it may be seen that whenever the flip-flop PR is reset so that its one output is low a call is being made on the rear transmission pair 203 irrespective of the condition of flip-flop PF. If both front and rear ports are unoccupied outpulsing will always be applied to the rear port in that case. Once flip-flop PR is set, the next outpulsing will be directed to the front transmission pair 201 by virtue of the fact that outpulsing is required and that the rear port is already occupied. To summarize, a low signal on the PR lead indicates a call is being made on the rear transmission pair 203 while a high on the PR lead indicates a call is being made on the front transmission pair 201.

The ringing is directed to the appropriate transmission pair via two gates 324 and 326. When gate 324 is fully enabled the ringing is applied to the rear transmission pair 203 by an enabling signal RGR. When gate 326 is fully enabled the ringing is applied to the front transmission pair 201 via an enabling signal RGF. Gate 324 is fully enabled when flip-flop PR is set (indicating a connection on the rear port) the flip-flop TRR Is reset (indicating that the connection is to a local telephone within the exchange and not to a distant exchange) and the flip-flop RGR is reset. Flip-flop RGR is set either by a signal applied to its direct set lead from the output of gate 312 indicating an incoming call or a recall (in which case ringing is not required) or by a signal applied to its toggle lead from a gate 325 via an inverter 328. This signal is applied when gate 325 is fully enabled by the application thereto of the enabling RGR signal via an inverter 327 and an RT signal which is applied by the ringing control circuit 222. The RT signal is generated once the rung party answers the call. Thus, to indicate ring trip for terminating the ringing signal once flip-flop RGR is set the enabling RGR signal is inhibited to either terminate ringing in response to the RT signal or to prevent its application from the outset when it is not required. Enabling of ringing on the front transmission pair 201 via the RGF signal operates the same as that just described.

Flip-flops PR and TRR are reset upon removal of the ground on the sleeve lead via an inverter 330 or upon a reset signal applied directly to their direct clear leads on a lead marked RSTR. Lead RSTR is connected to the output of gate 268, shown in FIG. 5 which is enabled when the rear port is forcibly released. Flip-flops PF and TRF are reset also by removal of the ground on the sleeve lead via an inverter 332 or by a reset signal applied directly to their direct clear leads via the RSTF lead. The RSTF lead is connected to the output of gate 274 shown in FIG. 5 which is fully enabled when the front port is forcibly released.

As explained earlier, the signals PR, TRR and TRF, RGR and RGF are applied to components in the loop circuit 78 for indicating over which transmission pair a call is being made for routing ringing and outpulsing signals.

Thus the operator loop complex of the invention is seen to provide important advantages over the prior art. The loop complex permits a large number of various type trunks to be used in conjunction with a large private automatic branch exchange with any one of the trunks being capable of connection to an operator console. This expedites the handling of telephone traffic and provides for greater flexibility in fairly distributing the same among the various exchange operators without the need for dedicated trunks and/or the inefficient utilization of trunks and switching equipment. Furthermore, the lock loop feature which may or may not be used at the option of the operator enables the equipment to be used most effectively since it can be entirely released for servicing other calls when deemed necessary, yet be locked in for permitting a local subscriber to recall the same operator who set up the call when that is deemed necessary.

The specific embodiment disclosed herein is intended to be merely illustrative and not restrictive of the invention since various circuit modifications readily apparent to those familiar with the art can be made without departing from scope and spirit of the invention as claimed hereinbelow.

What is claimed is:

1. An operator loop complex for use in a private automatic branch exchange having a plurality of trunks each with a first port for connection to a transmission path from one subscriber and a second port for connection to a transmission path from another subscriber, a switching network through which the trunks may be connected to an operator console, common control means responsive to service requests from the trunks for marking a trunk for connection through the switching network and further responsive to the service requests for generating request signals, each of said plurality of trunks having a trunk circuit means which is actuated for connecting the first and second ports to the switching network and which is deactuated for disconnecting the first and second ports from the switching network and interconnecting the two ports within the trunk, said trunk circuit means being initially actuated when its respective trunk is first marked by the common control means, said operator loop complex comprising:

a plurality of loop circuits, each having first and second transmission pairs for connection, respectively, to the first and second ports of a connected trunk;

mark enable means responsive to a request signal from the common control means for applying a mark enable signal simultaneously to all of said loop circuits;

means for selecting an idle one of said loop circuits;

marking means in each of said loop circuits responsive to said selecting means and said mark enable signal for generating a mark signal for connecting the selected loop circuit through the switching network to a marked trunk, and exclude circuit means and a pair of console transmission conductors connected between the operator console and the exclude circuit means and wherein each of said loop circuits includes loop circuit means responsive to an access signal from the operator console for connecting said first and second transmission pairs to said exclude circuit.

2. The operator loop complex of claim 1 wherein a loop release signal from the operator causes said loop circuit means to disconnect said first and second transmission pairs from said exclude circuit means and causes said trunk circuit means in a connected trunk to become deactuated thereby permanently disconnecting the trunk from the loop circuit.

3. The operator loop complex of claim 2 wherein an operator release signal from the operator console is applied to said loop circuit means to connect said first and second transmission paths together and disconnect said first and second transmission pairs from said exclude circuit means.

4. The operator loop complex of claim 1 wherein each loop circuit includes a port trunk monitor connected to the common control means and switching network for receiving signal indications as to which ports in a connected trunk are connected to subscriber transmission paths and which transmission paths are to distant exchanges.

5. The operator loop complex of claim 4 wherein said exclude circuit means is responsive to either an operator signal or a signal from said port trunk monitor and the switching network for selectively disconnecting one of said loop circuit trnasmission pairs while mantaining the other one connected to said exclude circuit means.

6. The operator loop complex of claim 5 wherein each of the trunks is programmed to release the transmission path connected to its first port in response to a signal from the operator and to release the transmission path connected to its second port in response to a different signal received from the operator.

7. The operator loop complex of claim 6 wherein each of said loop circuits includes loop detection circuit means connected to said first and second transmission pairs for detecting loop transmission paths to the first and second ports of a connected trunk and for generating signals to automatically disconnect the transmission path to a port when the transmission path loop is interrupted for a predetermined period.

* * * * *